United States Patent
Kim et al.

(10) Patent No.: US 6,842,769 B1
(45) Date of Patent: *Jan. 11, 2005

(54) AUTOMATICALLY CONFIGURED NETWORK SERVER

(75) Inventors: Steven D. Kim, Agoura Hills, CA (US); Lior Elazary, Agoura, CA (US)

(73) Assignee: Interland, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,270

(22) Filed: May 5, 2000

(51) Int. Cl.[7] .............................................. G06F 15/16
(52) U.S. Cl. ...................... 709/203; 709/217; 709/220; 717/171; 717/172; 717/174
(58) Field of Search ........................ 709/203, 217–219, 709/220–224; 717/168–178

(56) References Cited

U.S. PATENT DOCUMENTS

| 6,308,205 B1 | 10/2001 | Carcerano et al. | 709/221 |
| 6,434,619 B1 | 8/2002 | Lim et al. | 709/229 |
| 6,496,858 B1 | 12/2002 | Frailong et al. | 709/221 |
| 6,560,639 B1 * | 5/2003 | Dan et al. | 709/218 |

* cited by examiner

Primary Examiner—Jack B. Harvey
Assistant Examiner—Hieu C. Le
(74) Attorney, Agent, or Firm—Thomas, Kayden, Horstmeyer & Risley LLP

(57) ABSTRACT

A network server runs a routine that is triggered by an external database management program. The routine receives configuration parameters from the database, and configures application programs resident on the server in accordance therewith.

22 Claims, 11 Drawing Sheets

| Site Administration | | |
|---|---|---|
| Domain Name: | testsg20.com | Search |

Domain Name: testsgl20.com
Username: testsgl2
Password: test1234  [update]
Server: sgl20 (Virtual Host : Unix Standard)   — 36
IP Address: 207.190.100.4
Date Created: 2/4/00 7:52:25 AM
Space: 100  [update]
Max POP: 5  [update]
Max Aliases: 5  [update]
Frontpage: Yes ▼
TrellixWeb:
Anon. FTP: Yes ▼  [update]
SSL: Yes ▼  [update]
MySQL: Yes ▼  [update]
MSQL: Yes ▼  [update]
Servlets: Yes ▼
Cybercash: Yes ▼  [update]
PaymentNet: Yes ▼  [update]
ShopPlus: Yes ▼  [update]
Reseller: www.hostpro.net ▼  [update]
Email:   [resend]
Real Media Streams: ___ Space: ___ MB  [update]
Net Show: Bandwidth ___ Clients: ___  [update]

[SUSPEND SITE]

FIG. 3

| SERVER ID | SITE ID | SPACE | STREAMS |
|---|---|---|---|
| HP1008 | 7568A | 100 MB | 20 |
| HP1004 | 2234A | 50 MB | 10 |
| | | | |
| | | | |
| | | | |

MEDIA SERVER TABLE

FIG. 11

| SERVER ID | SITE ID | SPACE | IP | MEMORY | CPU |
|---|---|---|---|---|---|
| HP1004 | 9067C | 100 MB | | | 20 |
| HP1002 | 4356A | 10 MB | | | 10 |
| | | | | | |
| | | | | | |
| | | | | | |

WEB SERVER TABLE

FIG. 12

AUTOMATICALLY CONFIGURED NETWORK SERVER

CROSS REFERENCE TO RELATED APPLICATIONS

The disclosures of each of the following co-pending applications are hereby incorporated by reference in their entireties: application Ser. No. 09/565,269 filed on May 5, 2000 entitled "Synchronized Server Parameter Database;" application Ser. No. 09/565,268 filed on May 5, 2000 entitled "Method of Assigning Addresses to Network Resources;" and application Ser. No. 09/766,473 filed Jan. 19, 2001 entitled "System and Method for Managing Server Configurations."

BACKGROUND

1. Field

The invention relates to computer networks. In particular, the invention relates to managing network server configurations.

2. Description of Related Art

Explosive growth of the Internet, and in particular e-commerce, has resulted in a dramatic increase in the rate at which companies and individuals are creating network resources such as World-Wide-Web sites, email accounts, and the like. Most companies do not have a direct connection to the Internet and thus contract with a web hosting company, or internet service provider (ISP), to provide access to the Internet and to host the resources they wish to make available to other Internet users.

Typically a web hosting service provider may provide a wide range of e-commerce, application hosting, and connectivity services. For example, a company or individual may contract with a web hosting company to provide a specified amount of memory on a server for the company to establish and maintain its web site. In addition, the company may contract for other types of services, such as, for example, email services, secure socket layer (SSL), file transfer protocol (FTP) service, database services, and real media service allowing streaming audio and video from the company's web site.

After a company or individual has established its initial set of services with a web hosting service provider, they may wish to change the services it has contracted for. For example, if the company had not originally contracted for real media service, it may wish to add this feature to its web site. Typically, when a company wants to change the services it has contracted for, a request for the desired change would be communicated to the web hosting service provider. At the web hosting service provider, a system administrator would determine if the new services are available to the requesting company and which network servers of the web host's system should be configured to accommodate the requested configuration. The system administrator would then access the appropriate server and change the server configuration to conform to the requested change. In some instances, accessing the appropriate server may require the system administrator to travel to a remote site where a server is located. At some facilities, this process was partially automated by programming the servers with scripts that performed some tasks of the configuration process. However, administrator access to the server was still required to implement the configuration changes.

In addition, web hosting service providers must maintain accurate records of the server configurations. The records of the server configurations allow the web hosting service provider to monitor equipment utilization to help determine, for example, when increased customer demand would justify upgrading existing equipment, or bringing additional equipment on line. Accurate records are also required to ensure proper billing of companies contracting for the services provided. To both maintain server configurations according to customer desires, and to simultaneously track server configurations as they are altered over time, a system administrator would both update server configurations and also update a database containing information regarding server configurations. Requiring the system administrator to update a database is prone to errors in the entry, as well as inadvertently failing to record a configuration change that was made.

Therefore, there is a need in the art for a method and apparatus to improve the speed and efficiency of matching server configurations with customer desires. In addition, there is a need in the art for a method and apparatus to improve the recording and monitoring of network equipment configuration.

SUMMARY

In one embodiment, the invention comprises a network server comprising data storage and processing circuitry configured to execute at least one application program having operation defined in part by a set of configuration parameters. The network server also executes an application program configuration routine triggered by an external database management program to receive data from the external database management program and to update the set of configuration parameters in response thereto.

BRIEF DESCRIPTION OF THE DRAWINGS

FIG. 3 is a screen display allowing updates to a configuration parameter database.

FIG. 11 is an illustration of a first application program table of FIG. 5.

FIG. 12 is an illustration of a second application program table of FIG. 5.

DETAILED DESCRIPTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
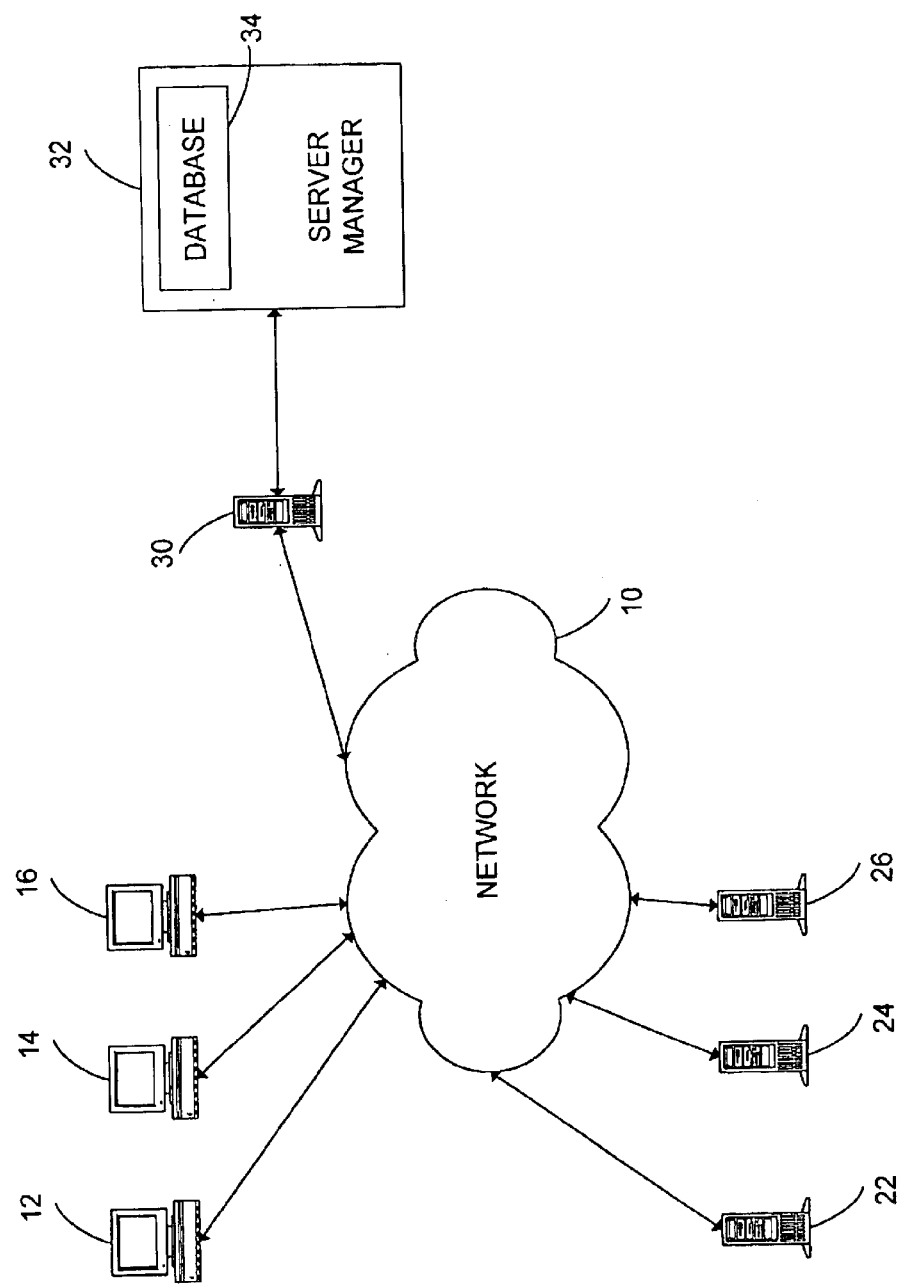
FIG. 1 as a diagram of a computer network in one embodiment of the invention.

FIG. 1 shows an exemplary computer network 10 connecting one or more computing machines. The network 10 may be any type of electronically connected group of computers including, for instance, the following networks: Internet, Intranet, Local Area Networks (LAN), Wide Area Networks (WAN) or an interconnected combination of these network types. In addition, the connectivity within the network 10 may be, for example, remote modem, Ethernet (IEEE 802.3), Token Ring (IEEE 802.5), Fiber Distributed Datalink Interface (FDDI), Asynchronous Transfer Mode (ATM), or any other communication protocol. Computing devices linked to the network may be desktop, server, portable, hand-held, set-top box, personal digital assistant (PDA), a terminal, or any other desired type or configuration. Depending on their functionality, the network connected devices may vary widely in processing power, internal memory, and other performance aspects. Communications within the network and to or from the computing devices connected to the network may be either wired or wireless. Wireless communication is especially advantageous for network connected portable or hand-held devices. The network 10 may include, at least in part, the world-wide public Internet which generally connects a plurality of users in accordance with a client-server model in accordance with the transmission control protocol/internet protocol (TCP/IP) specification. A client-server network is a dominant model for communicating between two computers. Using this relationship, a client computer (the "client") issues one or more commands to a server computer (the "server"). The server fulfills client commands by accessing available network resources and returning information to the client pursuant to client commands. During this process, client computer systems and network resources resident on the network servers are assigned a network address for identification during communications between elements of the network. Communications from other network connected systems to the servers will include the network address of the relevant server/network resource as part of the communication so that the appropriate destination of the data/request is identified as the recipient. When the network 10 comprises the global Internet, the network address is an IP address in the TCP/IP format which may, at least in part, route data to an e-mail account, a web-site, or other Internet tool resident on the server. In this way, information and services which are resident on the network servers may be available to the web browser of a client computer through a domain name (e.g. www.site.com) which maps to the IP address of the network server.

As shown in FIG. 1, a plurality of clients 12, 14, and 16 are connected to the network 10 via respective communication links. Typically, each of these clients may access the network 10 via any desired form of communication, such as via a dial-up modem connection, cable link, a digital subscriber line (DSL), wireless or satellite link, or any other form of communication. Each client may communicate using any machine that is compatible with the network 10, such as a personal computer (PC), work station, dedicated terminal, personal data assistant (PDA), or other similar equipment. The clients 12, 14, and 16 may or may not be located in the same geographical area.

As shown in FIG. 1, a plurality of servers 22, 24, and 26 are connected to the network 10 to serve clients that are in communication with the network 10. Each server is typically a powerful computer or device that manages network resources and responds to client commands. As is known in the art, the servers include computer readable data storage media such as hard disk drives and RAM memory that store program instructions and data. Using such stored programs, the servers 22, 24, 26 run application programs that respond to client commands. As shown in FIG. 1, for example, the server 22 may run a web server application for responding to client requests for HTML pages. It may also run a mail server application for receiving and routing electronic mail. Other application programs, such as an FTP server or a media server for streaming audio/video data to clients may also be running on the server 22. In some cases, different servers may be dedicated to performing different tasks. For example, the server 22 may be a dedicated web server that manages resources relating to web sites for various users, whereas the server 24 may be dedicated to provide electronic mail (email) management. Other servers may be dedicated for media (audio, video, etc.), file transfer protocol (FTP), or a combination of any two or more services that are typically available or provided over a network. Each server may be in a location that is the same as or different from that of other servers. Moreover, there may be multiple servers that perform mirrored tasks for users, thereby relieving congestion or minimizing traffic directed to and from a single server. In one embodiment of the invention, the servers 22, 24, 26 are under the control of a web hosting provider in the business of maintaining and delivering third party content over the network 10.

Web hosting providers deliver services to two different types of clients. One type, referred to herein as a "browser", requests content from the servers 22, 24, 26 such as web pages, email messages, video clips, etc. A second type of client, referred to herein as a "user", hires the web hosting provider to maintain a network resource such as a web site, and to make it available to browsers. Users contract with the web hosting provider to make memory space, processor capacity, and communication bandwidth available for their desired network resource, generally paying the web hosting provider in accordance with the amount of server resources the user desires to utilize.

In order for the web hosting provider to provide services for both of these clients, application programs which manage the network resources hosted by the servers must be properly configured. The program configuration process generally involves defining a set of parameters which control, at least in part, the application program's response to browser requests and which also define, at least in part, the server resources available to a particular user. In conventional web hosting environments, only network administrators associated with the web hosting company that owned the servers 22, 24, 26 were allowed access to the application program parameters to change application program operation so as to modify, for example, the amount of storage space allocated to a given user's web site. This helped insure tight control of the web hosting service provider over application program configuration. However, all user requests for new server resources or a reconfiguration of their existing resources required human intervention, which is slow and relatively expensive.

Figure 2:
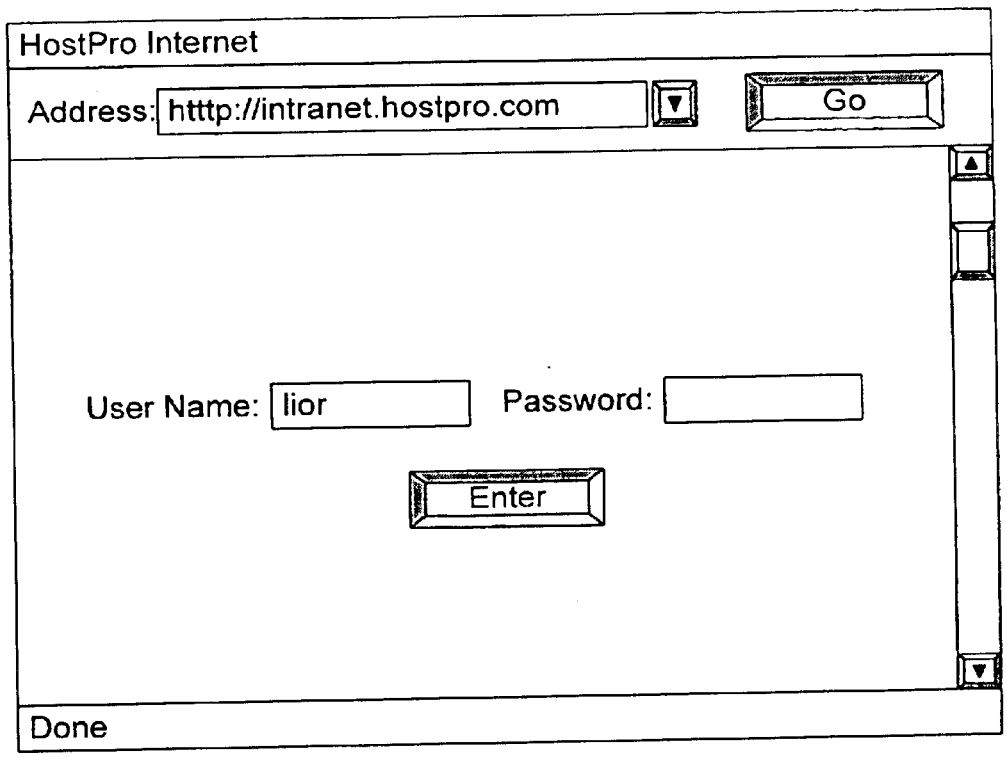
FIG. 2 is a screen display of a login screen for modifying configuration parameters.

In one embodiment of the invention, however, the user is provided access to application program parameters in a manner which still ensures adequate control over program configuration by the web hosting service provider. In one embodiment, an intranet server 30 is in communication with the network 10 via a communication link. The intranet server 30 is in communication with a server manager 32. The server manager 32 comprises a database of the application program configuration parameters which are being utilized in the servers 22, 24, 26. In this embodiment, users modify the database 34 via the intranet 30, and the server manager 32 interacts with the servers 22, 24, 26 to modify application program parameters so that they match the content of the database. In a typical operation, a user logs onto the intranet server 30 by connecting to the intranet 30 via computer 12 and entering authentication information, such as a username and password. An example screen display for entering this information is provided in FIG. 2.

In some advantageous embodiments, when the user wishes to sign up for new service or modify an existing service, the intranet server 30 authenticates the user (via the screen display of FIG. 2 for example) and provides the user with a interactive screen display/control panel that allows the user to access configuration parameters for a particular application program. One example of such an interactive screen display is illustrated in FIG. 3. In this embodiment, the user is presented with a number of modifiable text boxes that describe aspects of the configuration of the user's web site or other network resource.

For example, if a user desires to increase memory space reserved on a server for its web site, the user is provided with a "memory space" field 36 (FIG. 3) in which the user specifies the desired memory space. In response to receiving this information, the intranet server 30 updates the database 34. The server manager 32 forwards this information to the appropriate server, and the new parameter is used during application program operation. Thus, the intranet server 30 is configured to provide users with access to configuration parameters of hosted network resources (e.g., web pages, email, FTP sites, media sites, etc.), for which a user has contracted with the web hosting service provider.

As will be described in additional detail below, the configuration parameters may be stored in the database 34 in the format of a plurality of tables. When the user modifies the desired configuration parameter (e.g., memory space) for its web site, the intranet server 30 communicates such modification along with user identification information to the server manager 32. In turn, the server manager 32 updates one or more tables that include this parameter. Once the one or more tables are updated in the server manager 32, the server manager 32 communicates one or more commands to one or more of the servers 22, 24, and 26 indicating that the one or more tables of the server manager 32 has been modified. In one embodiment, the servers are configured to run a dedicated program (e.g., a daemon) that is triggered to retrieve the modified parameter from the updated table of the server manager 32. As is known in the art, a daemon commonly refers to a process that runs in the background and performs a specified operation at predefined times or in response to certain events. After being triggered by the server manager 32, the daemon updates the configuration of the application program (e.g., web server) with the retrieved parameter. One embodiment of this process is described in further detail in the description of the processes of FIGS. 4–6. Generally, the intranet server 30, server manager 32, and network servers 22, 24, 26 are all under the management and control of the web hosting service provider. In some embodiments, these computers will be located in a single facility and connected to a common local area network. In other embodiments, these computers are widely separated geographically and may communicate over the public Internet. The computers 12, 14, 16, utilized by the users to access the intranet 30 will generally be geographically remote from the server manager 32 and the servers 22, 24, 26, although it will be appreciated that one or more of these devices 12, 14, 16 may be directly connected to the intranet 30 or other LAN which includes the server manager 32.

Figure 4:
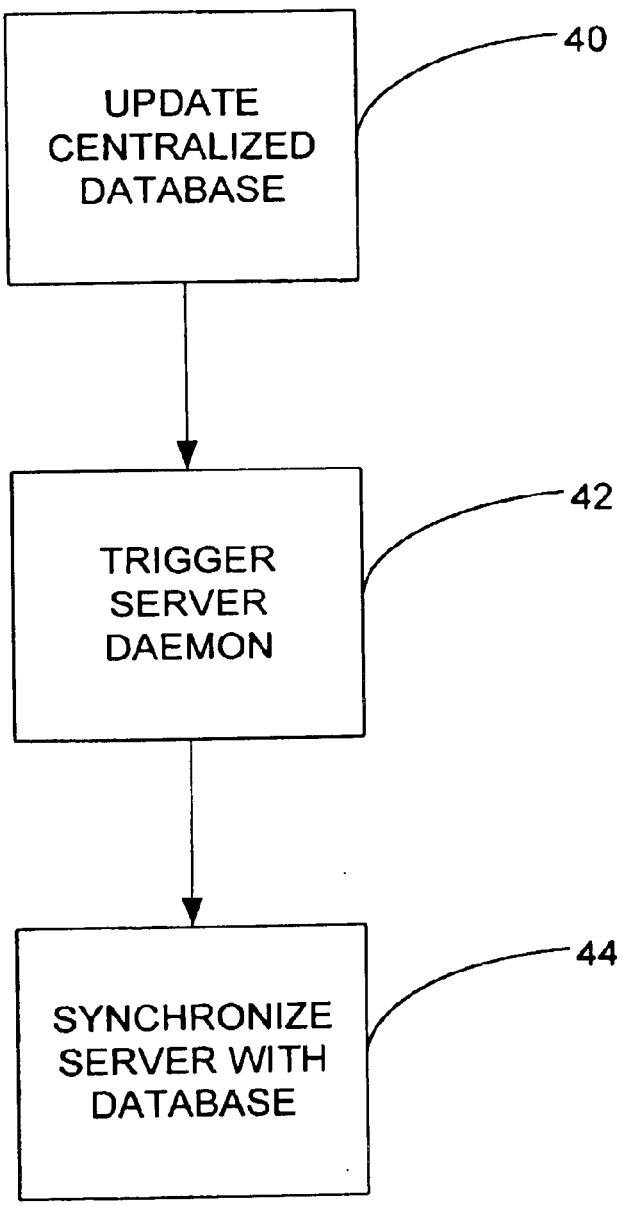
FIG. 4 is a flow chart of an automated server configuration process in one embodiment of the invention.

FIG. 4 is a flowchart of a method of updating a server configuration. The process begins in block 40, where a centralized database is updated with selected parameters to make the desired change to the configuration of a selected application program. This modification to the database may be made by a user, as described above, or by a network administrator associated with the web hosting service provider. After the centralized database has been updated, flow continues to block 42. In block 42, a program residing on a selected server, commonly referred to as a daemon, is initiated or triggered. When the daemon program is triggered, it will read the modified fields in the updated centralized database. Flow then continues to block 44. In block 44, the daemon, using the parameters from the modified fields of the centralized database, will update or synchronize the server configuration with the updated centralized database fields accordingly. In this way, a database of server configurations is kept consistent with the actual server configurations automatically and with little or no human intervention.

Figure 5:
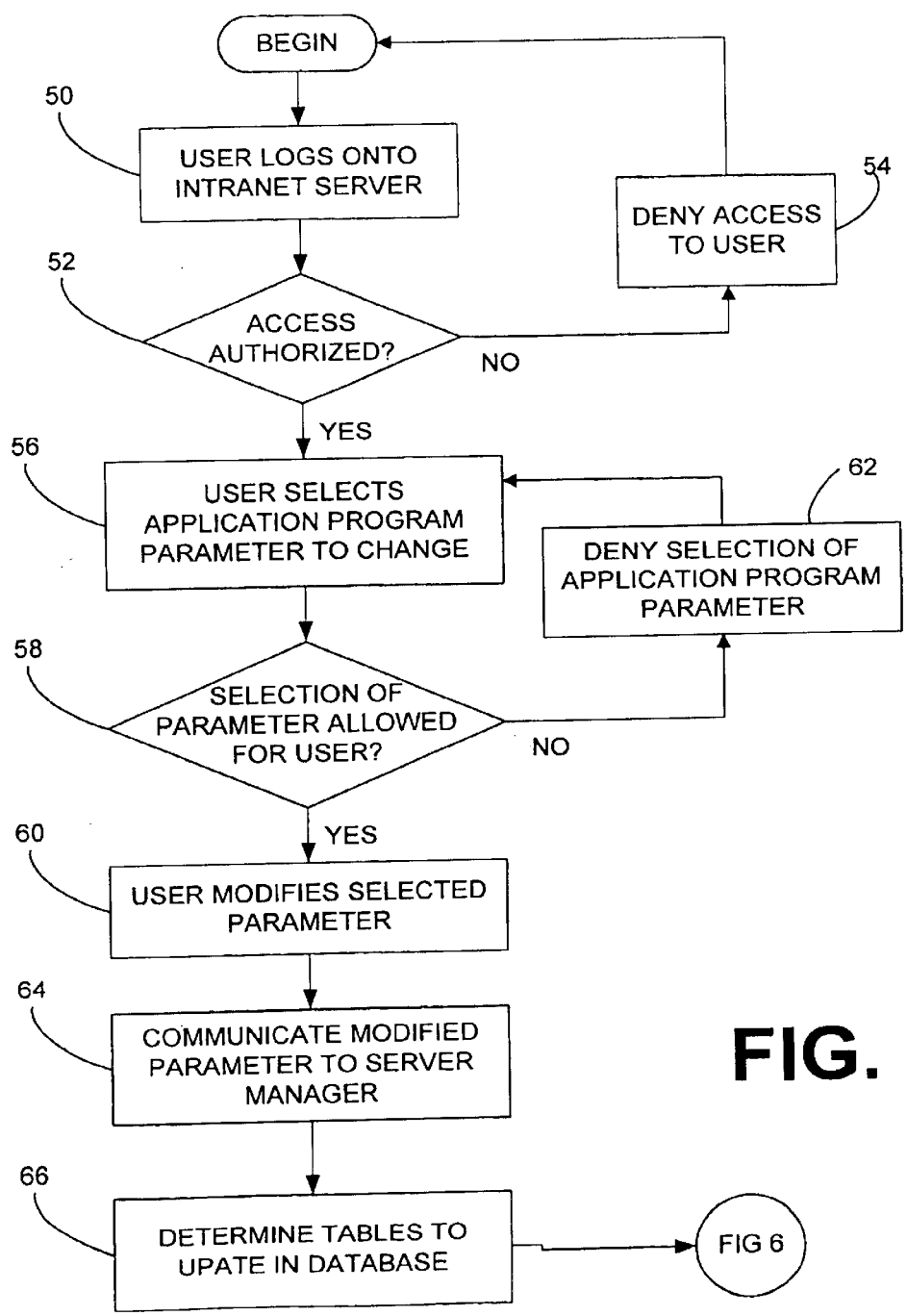
FIG. 5 is a flow chart of one method of user updating of a configuration database.
Figure 6:
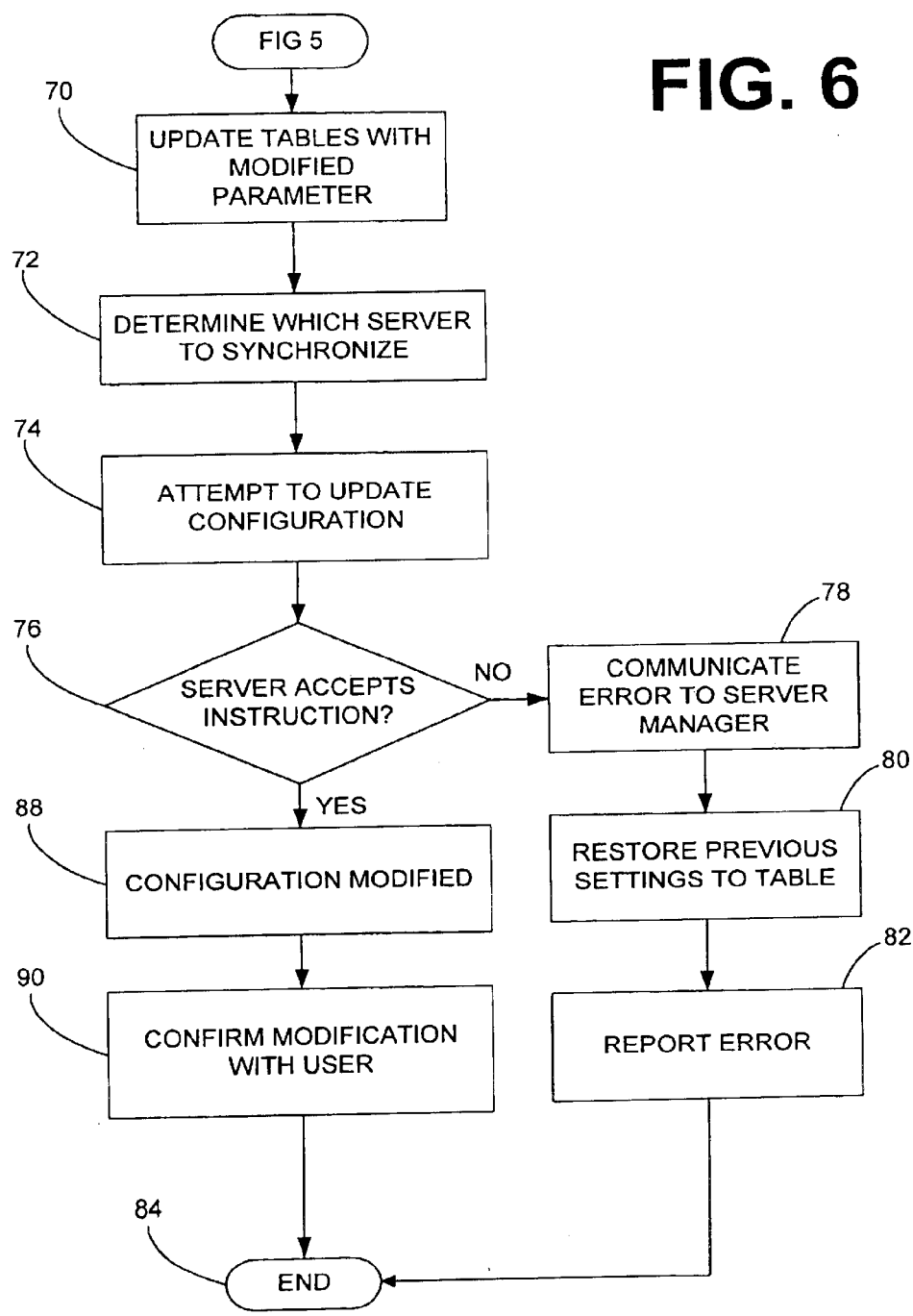
FIG. 6 is a flow chart of one method of user updating of a configuration database.

FIGS. 5 and 6 are flowcharts illustrating a specific embodiment of a method of modification of a server configuration in response to a user request. Process flow begins in block 48. In block 50, a user logs on to the web hosting Intranet server. In block 52, user access to the Intranet server is authenticated. User authorization may be determined through a set of criteria, or "business rules." For example, user access may be denied if the user does not have a valid account, or if the user is not current in their account balance.

If user access is not authorized, flow continues to block 54. In block 54, user access to the web hosting Intranet is denied and flow loops back to block 50. Returning to block 54, if user access is authorized, flow continues to block 56. In block 56, the user selects an application program parameter to change. For example, the user may select a web server configuration application program and request the amount of memory allocated to the user website be modified, such as, for example, to increase the memory allocated from 5 megabytes to 10 megabytes. In another example, the user may select an email application program. For example, the user may add new email accounts or delete existing ones. After the user has selected the application program parameter desired to be changed, flow continues to block 58.

In block 58, the application program parameter selected by the user is checked to determine if it is a parameter the user is allowed to modify. If the user has selected a parameter it is not allowed to modify, such as, for example, attempting to modify a service the user has not contracted for, flow continues to block 60. In block 60, the user is notified that the desired selection has been denied. Flow then continues to block 58. If the user has selected a parameter that is allowed to be modified, flow continues to block 62. In block 62, the user modifies the selected parameter as desired. In some embodiments, these process steps are accomplished by routing a control panel to the user which only allows the user access to those parameters the user is allowed to change. Referring back to FIG. 3, for example, a web-site modification control panel is illustrated which allows the user to modify some aspects of host service but not others. As described above, a space field allows the user to modify the space allocated to the site. However, the host server that the site is resident on and the associated IP address of the site are shown on the control panel, but are not user modifiable.

In block 64, the modified parameter is communicated to the server manager. Flow then continues to block 66. In block 66, the server manager evaluates the modified parameter and determines which table or tables are required to be updated in the server manager database. Flow then continues to block 70 in FIG. 6.

In block 70, the server manager updates the tables in the database with the modified parameters. In block 72, the server manager determines which server to synchronize with the updated database reflecting the user request. The server manager may determine a single server configuration is to be updated, or that a plurality of server configurations are to be updated, in response to the user request. Flow then continues to block 74.

In block 74, the server manager instructs the desired server, or plurality of servers, to update their configuration settings. Typically, updating of server configuration settings is performed by a server resident program, such as, for example, a daemon program as described above. Flow then continues to block 76.

In block 76, the server being reconfigured determines if it can accept the instructions and reconfigure itself in the desired manner. For example, if a request of additional memory for a web site is received by a server, the server will determine if there is sufficient memory available to perform the desired reconfiguration. If the server is unable to accept and perform the instructions, flow continues to block 78.

In block 78, the server communicates its inability to accept and perform the requested instructions by notifying the server manager of an error. Flow then continues to block 80. In block 80, the server manager upon receiving the error message restores the previous settings of parameters in the database tables. By restoring the previous settings of parameters in the tables, the server manager database remains synchronized with the server configuration. Flow then continues to block 82. In block 82, an error is reported to the user notifying the user that the requested modification was not performed. Flow then continues to block 84 where flow ends.

Returning to block 76, if the server accepts the instruction and can perform the reconfiguration, flow continues to block 88. In block 88, the server modifies the server configuration in accordance with the updated configuration settings. Flow then continues to block 90. In block 90, the server confirms to the user that the requested modification has been performed. Because the server has been successfully reconfigured, the server manager database is synchronized with the server configuration. It is possible, if the server being reconfigured is down, for example, that no error message or confirmation message is received by the server manager. In this case, the database modification will be reversed, and an error reported, as described above when an explicit error message is received. Flow then continues to block 84 where the process ends.

Figure 7:
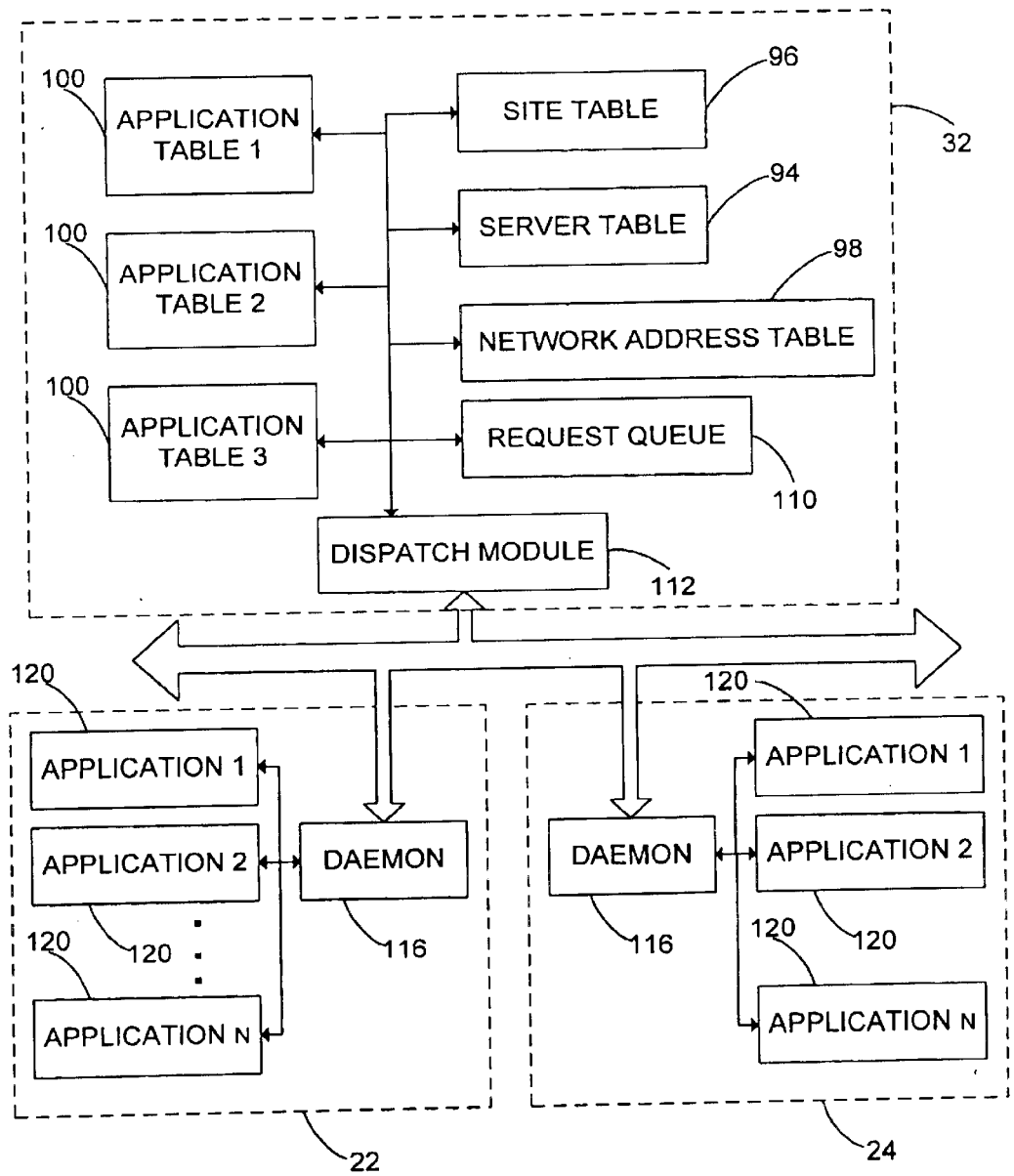
FIG. 7 is a block diagram of a server manager system in accordance with one embodiment of the invention.

FIG. 7 is a block diagram illustrating software modules that reside on the server manager 32 and the servers 22, 24, 26 that the server manager 32 communicates with. As described briefly above, the server manager 32 comprises a database that may advantageously be configured as a plurality of tables containing information about the configuration of the network servers. Although the server configuration information in this specific embodiment is in the form of a plurality of tables, a wide variety of data formats could be used.

Figure 9:
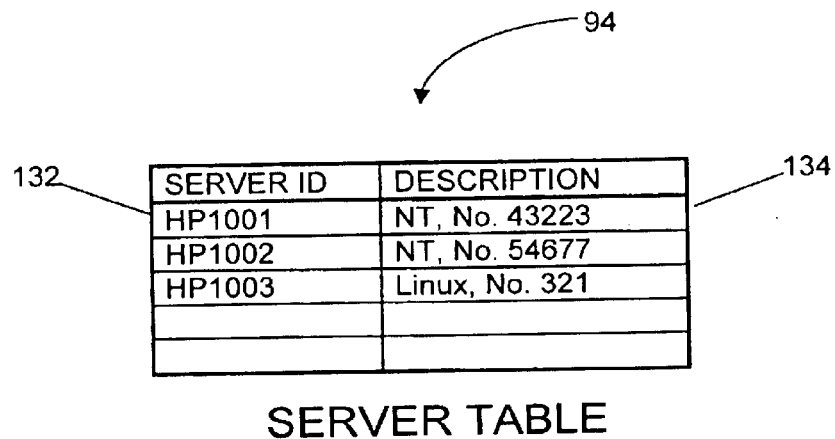
FIG. 9 is an illustration of a server table of FIG. 5.
Figure 10:
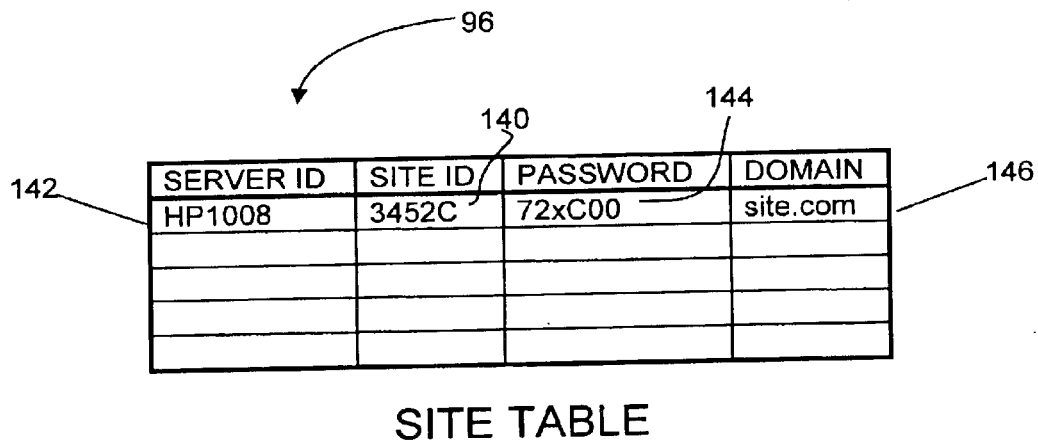
FIG. 10 is an illustration of the site table of FIG. 5.

As illustrated in FIG. 7, a server table 94 may be provided that contains information about the servers the server manager 32 is designated to communicate configuration parameters to. One embodiment of a server table is illustrated in FIG. 9. Another table 96 includes information about the network resources such as web-sites, email accounts, and the like that are present on the servers. This table may include information about location and properties of all network resources present on the servers. An embodiment of this site table is illustrated in FIG. 10. A network address table 98 contains information about each set of network addresses assigned to respective servers. This table is discussed in additional detail below.

Also advantageously provided are one or more application program tables 100. These tables contain information about the configuration of a selected application program that is running on one or more of the servers 22, 24, 26. For example, a web server table includes information on all web site resources such as server location, capacity, and the like that operate under the control of the web server application program. Similarly, a media server table includes information (such as, for example, maximum allowable number of simultaneously delivered streams) on all network resources that include media delivery capability and that use the media server application program to deliver media content to browsers.

A request queue 110 may be provided that stores requests to add to or modify the information present in the database tables. A FIFO queue may advantageously be utilized, and if desired, the request queue 110 can be configured to suspend modification requests under certain circumstances. For example, requests from a particular user may be suspended because of payment collection issues, for example, or requests which appear to be user errors, such as deleting an entire web site from the servers, can be suspended pending further investigation.

A dispatch module 112 is used to download information to the servers 22, 24, 26 when the tables have been modified or new information is added. The dispatch module triggers a daemon 116 that is resident on each server 22, 24, 26. As described above, the daemon is configured to receive the modified or new parameters from the server manager 32, and to reconfigure the application programs 120 such as web server, media server, etc.

Figure 8:
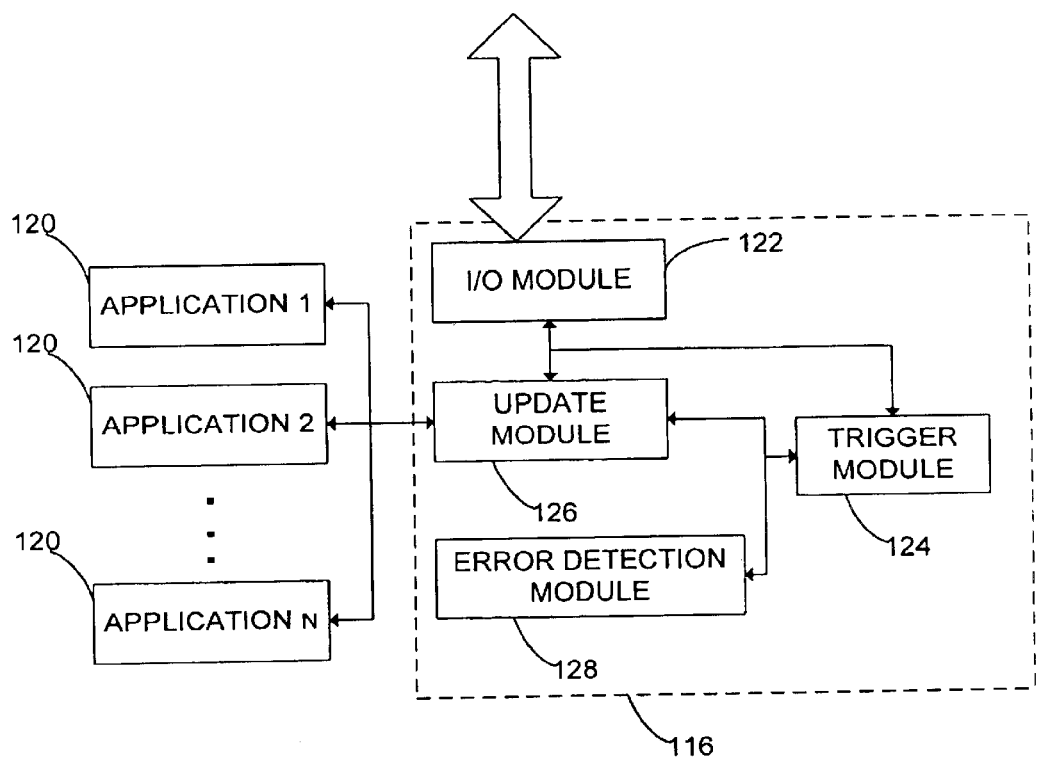
FIG. 8 is a block diagram of the server daemon of FIG. 5.

FIG. 8 illustrates one daemon 116 embodiment in additional detail. In this embodiment, the daemon 116 includes an I/O module 122 for communicating with the server manager 32. Also present is a trigger module 124 which receives a message from the server manager 32 that the server configuration needs to be updated in order to maintain synchronization with the database. Upon receiving this message, the trigger module 124 initiates the operation of an update module 126 and an error detection module 128. The update module receives the configuration data from the server manager 32, and modifies the application programs 120 accordingly. If the application programs accept the re-configuration, the error detection module sends a message to the server manager that the re-configuration has been successful. As described above, if no such message is received by the server manager 32, the database 34 is returned to its original state.

Returning now to the data stored in the database 34, FIGS. 9–12 illustrate specific embodiments of several of the data tables in the embodiment of FIG. 7 described above. It will be appreciated that these embodiments are only specific examples, and that more or fewer table fields could be provided depending on the information required to properly configure the application programs being used and the tracking information that the web hosting service provider would find useful in facility and customer management.

In FIG. 9, one embodiment of a server table 94 is illustrated. In this embodiment, only two fields are provided, an ID field 132 and a description field 134. The ID field comprises a unique name for the machine, and the description field may include a wide variety of information such as operating system, serial number, physical location of the machine, and the like. Of course, the description field 134 could be separated into several fields dedicated to specific server information.

In FIG. 10, one embodiment of a site table 96 is illustrated. This table comprises a comprehensive list of all of the network resources such as web sites that are on the servers controlled by the server manager 32. This table may include a field 140 for a unique site identification number (generally assigned by the web hosting service provider), a field 142 identifying the physical machine/server the site is resident on, a field 144 for storing the user password to access site information and modification tools, and a field 146 for the domain name if applicable.

FIGS. 11 and 12 illustrate application program tables. In FIG. 11, one embodiment of a table for media servers is illustrated. This table may include a field 150 for a site ID for each site having media delivery capacity. The table may also include a server ID field 152, identifying the server the site is located on, the field 154 for the space allocated for the site, and a field 156 for the maximum number of simultaneously deliverable media streams. In FIG. 12, a web server table is illustrated. This table advantageously also includes a field 160 for the site ID, a field 162 for the host server, and a field 164 for allocated space. The table may also include a field 166 for the site IP address. Additional fields 168, 170 for RAM memory and CPU allocation to the web site may be provided in this table.

During the table update process, the server manager 32 may derive or create and then enter the derived information into certain fields without a user specifying the field data. For example, if a user modifies the space allocated to their web site from 10 to 500 MB, the site may need to be moved to another physical server. If this is needed, the server manager 32 may be programmed to select a new server without further user input based on loading or available space considerations. The server selection is then entered into the appropriate table fields.

IP address designation is another example of a configuration parameter that may be performed automatically by the server manager 32. For example, if a new network resource such as a web site is being added by a new or existing customer, or if an existing site is being moved to a new physical server, an IP address must be assigned to the site being created or moved. An IP address is selected by searching the network address table 98 (FIG. 7) for an unused IP address assigned to the server that the network resource is to be resident on.

Figure 13:
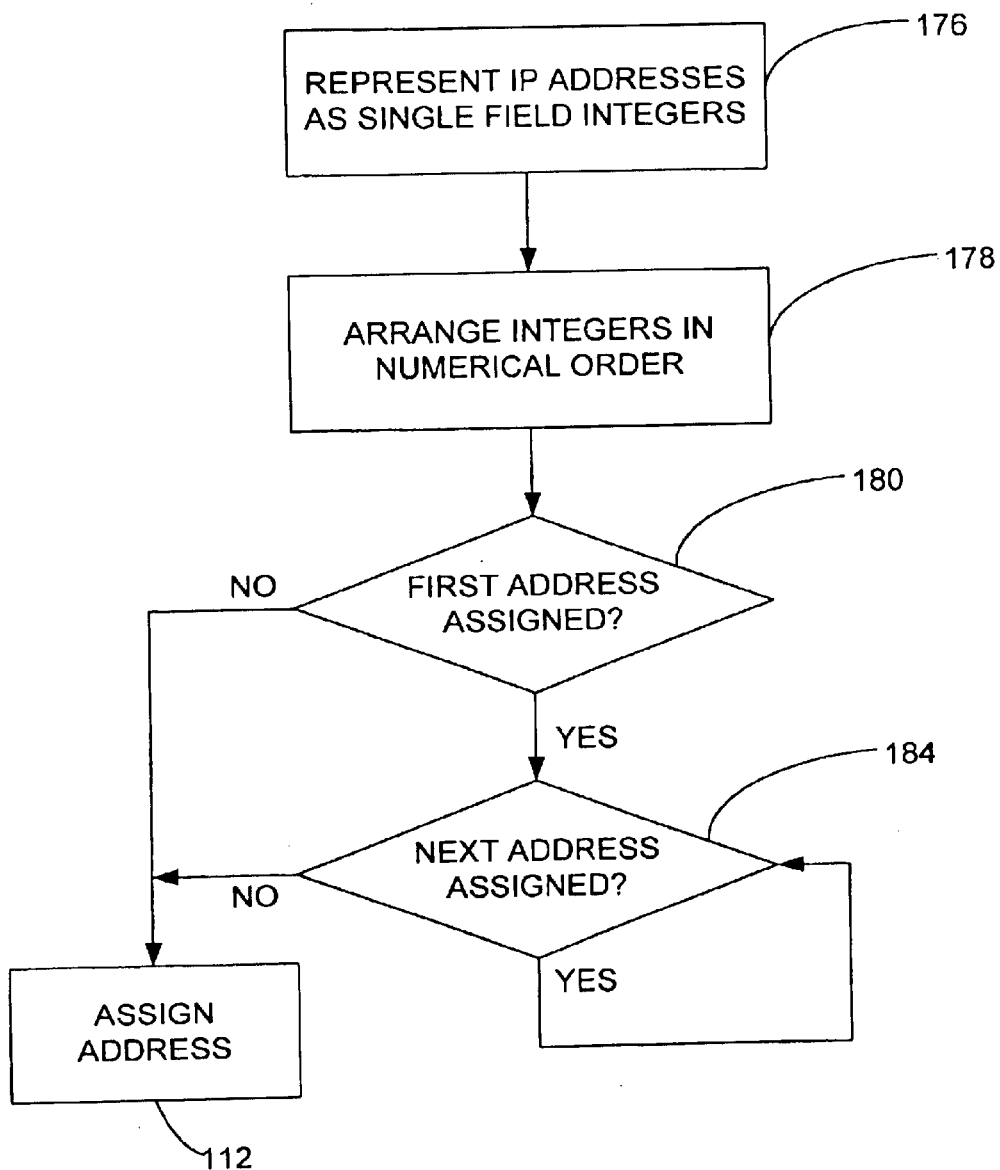
FIG. 13 is a flow chart of a method of assigning network addresses to network resources.

One advantageous embodiment of this process is illustrated in FIG. 13. As shown in this Figure, to facilitate the search for unused IP addresses, at block 176 the normal four field IP address such as the IP address 123.45.255.1, is stored in a single field representation such as 123452551, therefore becoming simply a stored integer. The network address table 98 thus comprises blocks of integers associated with corresponding servers. At block 178, the integers in each block in the table are arranged in ascending or descending numerical order. Integers in the table corresponding to currently used IP addresses are tagged.

When a new IP address needs to be allocated to a network resource, the network address table is searched for an unused IP address. This search is performed quickly using the single field representation because the search algorithm simply starts at the lowest IP address assigned to the relevant server and searches numerically upward until an available address is found. In this embodiment, therefore, the system determines at decision block 180 of FIG. 13 whether or not a first numerically represented IP address is already assigned to a network resource. If it is not, the process moves to block 182 and assigns this address to the new resource. If the first address is assigned, the next numerical IP address is checked at decision block 184. If this address is assigned, the system continues checking the next numerical IP address. Once an unused IP address is identified, the system moves to block 182 and assigns the unused address.

When the next address is to be assigned, the system again starts at the first numerical address at block 180, and again increments numerically until the first available address is identified. This procedure results in fast search times, and guarantees that IP addresses are used efficiently without wasting unused addresses in the middle of the block assigned to a given server that may have become available due to the deletion of a previously supported web site or other network resource.

Thus, utilizing the above described principles, the entire process of modifying server configuration and maintaining synchronization with a database that has the current server configuration stored therein may be performed automatically and without any intervention on the part of a network administrator at the web hosting service provider facility. Control over server configuration is maintained, an accurate centralized database of information for use by the administrator for allocating resources, user billing, and other management functions is provided, while at the same time providing a reduction in labor and cost over conventional server configuration management techniques.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A network server associated with a web hosting provider comprising:

data storage and processing circuitry, wherein said data storage and processing circuitry is configured to execute:

at least one application program having at least one configuration parameter, said configuration parameter defining at least in part a set of server resources available to a particular customer of the web hosting provider; and an application program configuration routine triggered by an external database management program to receive data from said external database management program and to update said configuration parameter in accordance with said data in response thereto.

2. The network server of claim 1, wherein said application program configuration routine comprises a trigger module for receiving an update request, an update module for performing said update request, and an error detection module for detecting successful performance of said update request.

3. The network server of claim 1, wherein said at least one application program is selected from the group consisting of web server, mail server, media server and FTP server.

4. The network server of claim 1, wherein said application program configuration routine monitors the successful completion of said update.

5. The network server of claim 1, wherein said application program configuration routine comprises a daemon.

6. The network server of claim 1, wherein said application program is selected from the group consisting of web server, mail server, media server and FTP server.

7. The network server of claim 1, wherein said application program manages at least one of said server resources.

8. The network server of claim 1, wherein the configuration parameter is selected from the group consisting of memory space, processor capacity, and communication bandwidth.

9. The network server of claim 2, further comprising a reconfiguration module for reconfigurating the application program according to the accepted configuration parameters.

10. A computer readable data storage medium having program instructions stored therein for configuring data processing circuitry to perform a method of configuring at least one application program, the method comprising:
   receiving a trigger from a database management program and in response thereto:
      accepting configuration parameters for at least one application program from said database management program, said application program running on a network server associated with a web hosting provider; and
      storing said configuration parameters,
   wherein each configuration parameter defines at least in part a set of server resources available to a particular customer of the web hosting provider.

11. The computer readable storage medium of claim 10, wherein said method additionally comprises detecting an error in said storing step.

12. The computer readable storage medium of claim 10, wherein said at least one application program is selected from the group consisting of web server, mail server, media server and FTP server.

13. The computer readable storage medium of claim 10, wherein said set of server resources is selected from the group consisting of memory space, processor capacity, and communication bandwidth.

14. The computer readable storage medium of claim 10, wherein said set of server resources is associated with said network server.

15. The computer readable storage medium of claim 10, wherein said method additionally comprises reconfiguring the application program according to the accepted configuration parameters.

16. The computer readable storage medium of claim 10, wherein said method additionally comprises:
   determining if the server resource can be reconfigured according to the accepted configuration parameters; and
   reporting an error, if the server resource cannot be reconfigured according to the accepted configuration parameters.

17. A network server associated with a web hosting provider comprising:
   memory circuitry storing application program configuration parameters, wherein each application program configuration parameter defines at least in part a set of server resources available to a particular customer of the web hosting provider;
   means for automatically updating said application program configuration parameters with values received from a database external to said network server.

18. The network server of claim 17, wherein said means for automatically updating said application program configuration parameters comprises a daemon.

19. The network server of claim 17, wherein said means for automatically updating comprises a trigger module for receiving an update request and in response thereto, activating an update module for storing said values received from said database.

20. The network server of claim 17, wherein said configuration parameter is selected from the group consisting of memory space, processor capacity, and communication bandwidth.

21. The network server of claim 17, further comprising means for reconfiguring the application program according to the accepted configuration parameters.

22. The network server of claim 17, further comprising:
   means for determining if the server resource can be reconfigured according to the accepted configuration parameters; and
   means for reporting an error, if the server resource cannot be reconfigured according to the accepted configuration parameters.

* * * * *